United States Patent
Abe et al.

(10) Patent No.: US 7,777,964 B2
(45) Date of Patent: Aug. 17, 2010

(54) PLASTIC ROD LENS, ROD LENS ARRAY, ROD LENS PLATE, IMAGE SENSOR AND PRINTER

(75) Inventors: Hiroshi Abe, Otake (JP); Takashi Saeki, Otake (JP); Tsuyoshi Nakagawa, Tokyo (JP); Norifumi Hirota, Otake (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 148 days.

(21) Appl. No.: 11/989,217

(22) PCT Filed: Jul. 21, 2006

(86) PCT No.: PCT/JP2006/314453

§ 371 (c)(1),
(2), (4) Date: Jan. 22, 2008

(87) PCT Pub. No.: WO2007/011013

PCT Pub. Date: Jan. 25, 2007

(65) Prior Publication Data

US 2009/0257128 A1 Oct. 15, 2009

(30) Foreign Application Priority Data

| Jul. 22, 2005 | (JP) | ............................ 2005-212153 |
| Aug. 19, 2005 | (JP) | ............................ 2005-239093 |
| Feb. 7, 2006 | (JP) | ............................ 2006-029848 |

(51) Int. Cl.
  G02B 1/00 (2006.01)
  G02B 1/08 (2006.01)
  G02B 3/00 (2006.01)
(52) U.S. Cl. ...................... 359/654; 359/652
(58) Field of Classification Search ................ 264/1.32; 359/652, 654, 806, 807
See application file for complete search history.

(56) References Cited

U.S. PATENT DOCUMENTS 5,731,906 A   3/1998   Morita (Continued)

FOREIGN PATENT DOCUMENTS

JP   7-35929 A   2/1995

(Continued)

OTHER PUBLICATIONS

English Translation of International Preliminary Report on Patentability (PCT/IB/373) prepared by the International Bureau in connection with PCT/JP2006/314453, pp. 1-6, Sep. 9, 2008.*

(Continued)

*Primary Examiner*—David N Spector
(74) *Attorney, Agent, or Firm*—Fitch, Even, Tabin & Flannery; Kendrew H. Colton (57) ABSTRACT

A plastic rod lens having a cylindrical shape with a radius R including a central axis; and an outer peripheral portion, wherein a refractive index $n_D$ decreases from the central axis to the outer peripheral portion, and the following requirements (1) to (3) are met:

$$43 \leq v_1 \leq 60 \quad (1)$$

$$|\{n_A \times v_A/(n_A-1)\} - \{n_B \times v_B/(n_B-1)\}| < 5 \quad (2)$$

$$n_0 - n_1 \geq 0.01 \quad (3)$$

wherein $n_1$, $n_0$, $n_A$, and $n_B$ represent refraction index $n_D$ in the outer peripheral portion, at the center, and at arbitrary points A and B, respectively, and $v_1$, $v_A$, and $v_B$ represent Abbe number v in the outer peripheral portion, and at the arbitrary points A and B, respectively.

11 Claims, 3 Drawing Sheets

U.S. PATENT DOCUMENTS 6,449,414 B1 * 9/2002 Tahara et al. ............... 385/120
6,941,041 B2 * 9/2005 Yamaguchi et al. ........... 385/34

FOREIGN PATENT DOCUMENTS

| | | |
|---|---|---|
| JP | 9-127310 A | 5/1997 |
| JP | 2000-35517 A | 2/2000 |
| JP | 2003-139912 A1 | 5/2003 |

OTHER PUBLICATIONS

Kouichi Nishizawa, "Chromatic aberration of the Selfoc lens as an imaging system," Applied Optics, vol. 19, No. 7, pp. 1052-1055, Apr. 1980.

Uozu, et al., Macromolecular Materials and Engineering, vol. 289, No. 1, pp. 56-62 (Jan. 21, 2004).

Fujii et al., Glass Technology, vol. 39, No. 2, pp. 74-78 (Apr. 1, 1998).

EPO Communication, in U.S. Appl. No. 06/768,331, dated Dec. 28, 2009.

* cited by examiner

PLASTIC ROD LENS, ROD LENS ARRAY, ROD LENS PLATE, IMAGE SENSOR AND PRINTER

This is a U.S. National Phase of International Application PCT/JP2006/314453, filed Jul. 21, 2006, and claims priority under 35 U.S.C. §119 based on Japanese Application Nos. 2005-212153, 2005-239093, and 2006-029848 filed Jul. 22, 2005; Aug. 19, 2005; and Feb. 7, 2006, the entire disclosures of which are hereby incorporated herein by reference.

TECHNICAL FIELD

The present invention relates to a plastic rod lens which can be used as an optical transmission line such as a cylindrical light-converging lens and an optical sensor, and also to a rod lens array, a rod lens plate, an image sensor, and a printer.

BACKGROUND ART

In general, a plastic rod lens is a lens element having a cylindrical shape and is constituted of plastic materials. Its refractive index decreases continuously from its central axis to its outer peripheral portion to form an erect image of the same size. The plastic rod lens is widely used in the form of a rod lens array where both end surfaces of each lens are mirror polished and many of these polished lenses are arranged closely and then bonded/integrated. The application includes components of an image sensor in various scanning devices (e.g. a hand scanner), a copier, and a facsimile; and a write device of an LED printer. Since the plastic rod lens can be manufactured at low cost and the optical system installed with the lens can be made compact, its field of application is expanding.

Particularly due to the rapid circulation of a printer combined with a color scanner with a high resolution of 600 dpi or higher in recent years, a demand for a plastic rod lens with favorable color characteristics (i.e. with a small chromatic aberration) is increasing. However, it has been difficult to obtain a plastic rod lens having a small chromatic aberration since, for example, only a limited choice of materials is available compared to the glass rod lens.

Patent Document 1 discloses that it is possible to obtain a plastic rod lens having a small chromatic aberration where the difference in Abbe numbers in the plastic rod lens is 2 or less by combining an alicyclic methacrylate with a methyl methacrylate (MMA). In addition, Patent Document 2 discloses that it is possible to obtain a plastic rod lens having a small chromatic aberration by using an alicyclic methacrylate, MMA, and a fluorinated alkyl methacrylate. In the techniques disclosed in the above documents, the Abbe number at the center of a plastic rod lens is equal to or smaller than the Abbe number in its outer peripheral portion, and although smaller chromatic aberrations compared to those of the conventional plastic rod lens are achieved, a plastic rod lens having a small chromatic aberration which is equivalent to that of a glass rod lens has not been obtained.

Additionally, Patent Document 3 discloses a gradient index optical element which is made from a synthetic resin composed of a copolymer using 3 kinds of monomers. With this optical system, a spectacle lens or a contact lens having a characteristic (i.e. the refractive index increases as the Abbe number increases) is achieved. However, since a bromine-containing monomer or a crosslinkable monomer which is corrosive to a manufacturing facility is used as a monomer having high refractive index, it was difficult to apply the technique to the manufacturing process of a plastic rod lens.

Further, Non-Patent Document 1 discloses the following formulae for expressing chromatic aberration.

$$\frac{\Delta P}{P} = -\frac{1}{2}\frac{\Delta A}{A}$$
$$= \frac{1}{2}\frac{N_0 \cdot \Delta N_{r0} - N_{r0} \cdot \Delta N_0}{(N_0 - N_{r0}) \cdot N_0}$$

(In the formula, P represents a period length, $\Delta$ represents changes due to the wavelength, A represents a positive constant, $N_0$ represents a refractive index on the central axis, and $N_{r0}$ represents a refractive index at a point where the distance from the central axis is r0. Note that the relationship among P, A, and $N_0$ is expressed by the following formulae.)

$$P = \frac{2\pi}{\sqrt{A}}$$
$$N = N_0\left(1 - \frac{A \cdot r^2}{2}\right)$$

(N: refractive index at a point where the distance from the central axis is r.)

However, there were not any Specific Descriptions of the Plastic Rod Lens with a small chromatic aberration.

Patent Document 1: Japanese Unexamined Patent Application, First Publication No. 7-35929

Patent Document 2: Japanese Unexamined Patent Application, First Publication No. 2000-35517

Patent Document 3: Japanese Unexamined Patent Application, First Publication No. 9-127310

Non-Patent Document 1: K. Nishizawa, Appl. Opt. 19, 1052 (1980)

DISCLOSURE OF THE INVENTION

Problems to be Solved by the Invention

An object of the present invention is to provide a plastic rod lens with a reduced chromatic aberration and which has favorable color characteristics, a rod lens array and a rod lens plate, and to provide an image sensor and a printer which use them.

Means for Solving the Problem

The present inventors discovered, by deriving the following formulae which improve chromatic aberrations from the formulae described in the above Non-Patent Document 1, that chromatic aberrations are dramatically reduced when the relationships expressed in the following formulae are established by decreasing a refractive index $n_D$ from the central axis to an outer peripheral portion in the plastic rod lens.

$$\frac{n_0 \cdot v_0}{n_0 - 1} = \frac{n_r \cdot v_r}{n_r - 1} (= K)$$

($v_i$: Abbe number at a position i; n: refractive index at a position r.)

A first aspect of the present invention is a plastic rod lens having a cylindrical shape with a radius R and has a central axis and an outer peripheral portion and in which a refractive index $n_D$ decreases from the central axis to the outer peripheral portion and the following requirements (1) to (3) are met:

$$43 \leq v_1 \leq 60 \tag{1}$$

$$|\{n_A \times v_A/(n_A-1)\} - \{n_B \times v_B/(n_B-1)\}| < 5 \tag{2}$$

$$n_0 - n_1 \geq 0.01 \tag{3}$$

(In the formula, $n_1$, $n_0$, $n_A$, and $n_B$ represent the refractive index $n_D$ in the outer peripheral portion, at the center, and at arbitrary points A and B, respectively. $v_1$, $v_A$, and $v_B$ represent the Abbe number $v_D$ in the outer peripheral portion, and at the arbitrary points A and B, respectively.)

In the present invention, the refractive index at the center refers to the refractive indices at points within a 0.07 mm range from the central axis on a plane perpendicular to the central axis. Refractive index is that measured at 25° C.

In the aforementioned plastic rod lens, a polymer which constitutes the plastic rod lens may contain the following blocks (A) to (C).

(A) a (meth)acrylate unit containing an alicyclic ring and/or a heterocyclic ring.

(B) a monomer unit containing an aromatic ring.

(C) a fluorinated alkyl(meth)acrylate unit.

In the present invention, the word "(meth)acrylate" is a generic term which includes methacrylates and acrylates. In order to improve heat resistance of the plastic rod lens, it is preferable to use methacrylates.

The aforementioned polymer may further contain a building block (D) which is a methyl (meth)acrylate unit.

In the aforementioned plastic rod lens, the content of the building block (B) in the polymer may increase continuously towards the outer peripheral portion at least within a distance range of 0.8 R to R from the central axis.

In the aforementioned plastic rod lens, a polymer containing the building block (A) may be contained at least within the distance range of 0 to 0.5 R from the central axis; a polymer containing the building block (D) may be contained at least within a distance range of 0 to R from the central axis; and a polymer containing the building blocks (B) and (C) may be contained at least within a distance range 0.5 R to R from the central axis.

The aforementioned plastic rod lens may be obtained by the following processes. N items of uncured materials (refractive index n and Abbe number v after curing satisfy the formulae $n_1 > n_2 > \ldots > n_N$ and $v_1 > v_2 > \ldots > v_N$ ($N \geq 3$)) are laminated concentrically, with a configuration so that refractive indices and Abbe numbers sequentially reduce from the central axis to the outer peripheral portion, to form into an uncured laminated body (hereinafter referred to as a filament). The filament is cured during or after the interdiffusion of materials present in the adjacent layers so that the refractive index distribution between each layer of this filament is preferably continuous.

A second aspect of the present invention is a rod lens array formed by arranging one or more lines of the aforementioned plastic rod lenses in parallel.

It is preferable that the aforementioned rod lens array satisfies the following requirements in which $Tc(\lambda)$ represents a conjugation length of the rod lens array when the light wavelength is $\lambda$ nm.

$$Tc(630) - Tc(470) \leq 0.3 \text{ mm, and } Tc(525) \leq 12 \text{ mm} \tag{4}$$

A third aspect of the present invention is a rod lens plate formed by arranging the aforementioned plastic rod lens two-dimensionally.

A fourth aspect of the present invention is an image sensor using the aforementioned rod lens array or the aforementioned rod lens plate.

A fifth aspect of the present invention is a printer using the aforementioned rod lens array or the aforementioned rod lens plate.

A sixth aspect of the present invention is a composition containing the following components (A) to (F):

(A) 0 to 15% by mass of a (meth)acrylate containing an alicyclic ring and/or a heterocyclic ring, (B) 1 to 30% by mass of a monomer containing an aromatic ring, (C) 10 to 50% by mass of a fluorinated alkyl(meth)acrylate, (D) 30 to 80% by mass of a methyl (meth)acrylate, and (F) 0.01 to 2% by mass of a polymerization initiator.

EFFECTS OF THE INVENTION

According to the present invention, it is possible to obtain a plastic rod lens with a small chromatic aberration and which has excellent color characteristics, a rod lens array, and a rod lens plate. In addition, by using such a rod lens array or a rod lens plate, it is possible to obtain a color image sensor having a high resolution or a color printer having a high resolution.

BRIEF DESCRIPTION OF THE REFERENCE SYMBOLS

5: Filament; 6: Interdiffusion section; 7(A): First curing section (First light-irradiation section); 7(B): Second curing section (Second light-irradiation section); 8: Pull roller; 9: Base fiber of plastic rod lens; 11: Inert gas inlet; 12: Inert gas outlet; 13: Concentric multi-component fiber-spinning nozzle; 14: First pull roller; 15: Second pull roller; 16: Third pull roller; 17: Heating furnace (drawing); 18: Heating furnace (relaxation); 19: Plastic rod lens.

BEST MODES FOR CARRYING OUT THE INVENTION

The preferred embodiments of the present invention will be described in detail below.

When the plastic rod lens of the present invention has a radius R in a cross-section which is perpendicular to the central axis, it is preferable that the refractive index distribution from the central axis to an outer peripheral portion at least within the range of 0.3 R to 0.7 R approximate to a quadratic curve distribution defined by the following formula (5).

$$n(L) = n_0 \{1 - (g^2/2) L^2\} \tag{5}$$

(In the formula, $n_0$ represents a refractive index $n_D$ in the central axis of the plastic rod lens (central refractive index); L represents a distance from the central axis of the plastic rod lens ($0 \leq L \leq R$); g represents a refractive index distribution constant; and n(L) represents a refractive index at a position where the distance from the central axis of the plastic rod lens is L.)

In the present invention, it is preferable that the Abbe number ν also decreases with the refractive index $n_D$. Moreover, the refractive index $n_D$ and the Abbe number ν preferably decrease continuously from the central axis to the outer peripheral portion.

The plastic rod lens of the present invention needs to meet the conditions described in the aforementioned formulae (1) to (3). When the condition described in the aforementioned formula (1) is met, changes in the refractive index due to the changes in the wavelength are small, and thus it is effective in enhancing yield. In order to reduce changes in the refractive index due to the changes in the wavelength, k is preferably 150 or more.

By meeting the condition described in the formula (2), the chromatic aberration dramatically reduces. It is more preferable that the left side of the equation (2) be less than 2.

Additionally, a plastic rod lens with a clear view which has a large angular aperture can be made when the condition of the formula (3) is met.

A particularly characteristic feature of the plastic rod lens of the present invention is that both the Abbe number and refractive index in the outer peripheral portion are low. The outer peripheral portion having a low refractive index and also a low Abbe number can be achieved by using a polymer containing the building blocks (B) and (C) in the outer peripheral portion of the plastic rod lens. The building block (B) has a refractive index of 1.55 to 1.65, which is high, and an Abbe number of 20 to 40, which is low.

In addition, the building block (C) has a refractive index of 1.39 to 1.41, which is low, and an Abbe number of 62 to 68, which is high. The polymer containing such building blocks (B) and (C) gives the outer peripheral portion of the plastic rod lens a low refractive index and a high Abbe number, which are required. In particular, the weight ratio between the building blocks (B) and (C) is preferably 1:1 to 1:15. This makes it easy to render the refractive index $n_D$ and the Abbe number ν decrease continuously from the central axis to the outer peripheral portion.

The plastic rod lens of the present invention preferably has a refractive index of 1.400 to 1.500 and an Abbe number of 45.0 to 57.0 in its outer peripheral portion. More preferably, it has a refractive index of 1.470 to 1.490 and an Abbe number of 52.0 to 55.0 in its outer peripheral portion, and has a refractive index of 1.490 to 1.510 and an Abbe number of 54.0 to 57.0 in its center. This setting makes it easy to incorporate a methyl (meth)acrylate, which can readily be fiber-spun, in a building block.

Moreover, by making the conjugation length short and also making the differences between the conjugation lengths at 470 nm and at 630 nm small in order to satisfy the aforementioned formula (4), it is possible to improve the color characteristics, make the optical system compact, and shorten the distance (optical path length) from a manuscript to an image.

The polymer constituting the plastic rod lens of the present invention preferably contains the following units (A) to (C) as building blocks so that the lens can readily be designed in order to satisfy the aforementioned formulae (1) to (3).

(A) a (meth)acrylate unit containing an alicyclic ring and/or a heterocyclic ring.

(B) a monomer unit containing an aromatic ring.

(C) a fluorinated alkyl(meth)acrylate unit.

It is preferable that the above polymer further contain a unit (D) which is a methyl(meth)acrylate unit as a building block since the fiber-spinning of the plastic rod lens is easy.

In the present invention, it is preferable that the content of the building block (B) in a polymer at least within the distance range 0.8 R to R from the central axis increase continuously towards the outer peripheral portion. Moreover, it is preferable that the sum of the contents of the building blocks (B) and (C) in the polymer at least within the distance range 0.5 R to R from the central axis increase towards the outer peripheral portion. This makes is possible to lower the Abbe number towards the outer peripheral portion while suppressing an excessive increase in the refractive index.

In the present invention, it is preferable that a polymer containing the building block (A) be contained at least within the distance range of 0 to 0.5 R from the central axis; a polymer containing the building block (D) be contained at least within the distance range of 0 to R from the central axis; and a polymer containing the building blocks (B) and (C) be contained at least within the distance range 0.5 R to R from the central axis.

It is more preferable that the aforementioned polymer contain, in the region which is within the distance range of 0.5 R to R from the central axis, the following as building blocks; i.e.

(A) a (meth)acrylate unit containing an alicyclic ring and/or a heterocyclic ring: 0 to 40% by mass, (B) a monomer unit containing an aromatic ring: 1 to 50% by mass, (C): a fluorinated alkyl(meth)acrylate unit: 5 to 50% by mass, and (D): a methyl(meth)acrylate unit: 10 to 80% by mass, and that the aforementioned polymer contain, in the region which is within the distance range of 0 to 0.5 R from the central axis, (A): a (meth)acrylate unit containing an alicyclic ring and/or a heterocyclic ring: 5 to 60% by mass, (B): a monomer unit containing an aromatic ring: 0 to 10% by mass, (C): a fluorinated alkyl(meth)acrylate unit: 0 to 50% by mass, and (D): a methyl (meth)acrylate unit: 60 to 90% by mass.

It is even more preferable that the aforementioned polymer contain, in the region which is within the distance range of 0.5 R to R from the central axis, the following as building blocks; i.e.

(A) a (meth)acrylate unit containing an alicyclic ring and/or a heterocyclic ring: 0 to 30% by mass, (B) a monomer unit containing an aromatic ring: 1 to 30% by mass, (C): a fluorinated alkyl(meth)acrylate unit: 5 to 50% by mass, and (D): a methyl(meth)acrylate unit: 30 to 80% by mass, and that the aforementioned polymer contain, in the region which is within the distance range of 0 to 0.5 R from the central axis, (A): a (meth)acrylate unit containing an alicyclic ring and/or a heterocyclic ring: 5 to 50% by mass, (B): a monomer unit containing an aromatic ring: 0 to 5% by mass, (C): a fluorinated alkyl(meth)acrylate unit: 0 to 20% by mass, and (D): a methyl(meth)acrylate unit: 60 to 90% by mass.

It is particularly preferable that the aforementioned polymer contain, in the region which is within the distance range of 0.8 R to R from the central axis, the following as building blocks; i.e.

(A) a (meth)acrylate unit containing an alicyclic ring and/or a heterocyclic ring: 0 to 10% by mass,
(B) a monomer unit containing an aromatic ring: 1 to 30% by mass,
(C): a fluorinated alkyl(meth)acrylate unit: 10 to 50% by mass, and
(D): a methyl(meth)acrylate unit: 30 to 80% by mass.

The components which polymerize to form the building block (A) will be described.

Examples of the (meth)acrylates containing an alicyclic ring include an adamantyl methacrylate (refractive index and Abbe number of a polymer thereof is 1.53 and 54, respectively), an isobornyl methacrylate (refractive index and Abbe number of a polymer thereof is 1.50 and 54, respectively), and a tricyclo[5.2.1.0$^{2,6}$]decyl methacrylate (TDMA; refractive index and Abbe number of a polymer thereof is 1.53 and 55, respectively).

The (meth)acrylates containing a heterocyclic ring preferably contain oxygen, nitrogen, or sulfur as an element contained in the heterocyclic ring, and those containing sulfur are particularly preferable for their high refractive indices. For example, a methacrylate having a sulfonyl skeleton (refractive index and Abbe number of a polymer thereof is 1.5 or more and 55 or more, respectively) is preferable. Examples of the methacrylates having a sulfonyl skeleton include a 3-methacryloyloxysulfolane (SFMA), 3,3-dioxide-3-thiatricyclo[5.2.1.0$^{2,6}$]decyl-8-, and -9-methacrylate (DTTCMA), and 1,1-dioxidetetrahydrothien-3-yl methacrylate (DTHTMA).

As the components which polymerize to form the building block (A), it is possible to use either a (meth)acrylate containing an alicyclic ring or a (meth)acrylate containing a heterocyclic ring. It is also possible to use a (meth)acrylate containing both an alicyclic ring and a heterocyclic ring in one molecule, or a mixture of a (meth)acrylate containing an alicyclic ring and a (meth)acrylate containing a heterocyclic ring.

Examples of the components which polymerize to form the building block (B) include a phenyl(meth)acrylate, a benzyl acrylate, a benzyl methacrylate (BzMA), a phenethyl(meth)acrylate, a naphthyl(meth)acrylate, a styrene (n=1.59), a chlorostyrene (n=1.61), and a vinylnaphthalene.

Examples of the components which polymerize to form the building block (C) include 2,2,2-trifluoroethyl(meth)acrylate, 2,2,3,3-tetrafluoroethyl(meth)acrylate, 2,2,3,3,4,4,5,5-octafluoropentyl acrylate, and 2,2,3,3,4,4,5,5-octafluoropentyl methacrylate (8 FM). Among them, 8 FM is preferable for its excellent copolymerizability with other monomers such as (meth)acrylates and its excellent compatibility with a copolymer.

In the present invention, it is preferable to contain a component which polymerizes to form the building block (D) from the viewpoints of transparency, compatibility, and ease of fiber-spinning. A methyl(meth)acrylate is particularly preferable as such a component and a methyl methacrylate (MMA) is even more preferable.

The plastic rod lens of the present invention may contain a building block (E) other than the above building blocks (A) to (D). The content of the building block is preferably 0 to 20% by mass. Examples of the monomers which polymerize to form the building block (E) include (meth)acrylates such as an ethyl(meth)acrylate, a hydroxyalkyl(meth)acrylate, an alkylene glycol (meth)acrylate, a trimethylolpropane di- or a tri-(meth)acrylate, a pentaerythritolpropane di-, a tri-, or a tetra-(meth)acrylate, diglycerine tetra(meth)acrylate, and a dipentaerythritol hexa(meth)acrylate; vinyl acetate (n=1.47), diethylene glycol bisallylcarbonate, and fluorinated alkylene glycol poly(meth)acrylate.

Examples of the compositions of stock solutions in the first to fifth layers are given below when a plastic rod lens is configured of 5 layers by selecting TDMA, BzMA, 8 FM, and a methyl methacrylate as the components to form the building blocks (A) to (D), respectively.

TABLE 1

| | | Composition of stock solution (% by mass) | | | | Physical properties after curing | | |
|---|---|---|---|---|---|---|---|---|
| | | MMA | TDMA | BzMA | 8FM | Refractive index n | Abbe number v | n · v/(n − 1) |
| System 1 | First layer | 0.15 | 0.35 | 0.5 | — | 1.538 | 45.2 | 129.4 |
| | Second layer | 0.15 | 0.28 | 0.52 | 0.05 | 1.534 | 44.9 | 129.0 |
| | Third layer | 0.1 | 0.14 | 0.56 | 0.2 | 1.523 | 44.2 | 128.7 |
| | Fourth layer | 0.1 | 0.1 | 0.57 | 0.23 | 1.520 | 44.0 | 128.6 |
| | Fifth layer | — | — | 0.6 | 0.4 | 1.506 | 43.4 | 129.0 |
| System 2 | First layer | 0.3 | 0.25 | 0.45 | — | 1.531 | 46.0 | 132.6 |
| | Second layer | 0.28 | 0.18 | 0.47 | 0.07 | 1.526 | 45.7 | 132.6 |
| | Third layer | 0.26 | 0.1 | 0.49 | 0.15 | 1.520 | 45.4 | 132.6 |
| | Fourth layer | 0.2 | 0.06 | 0.51 | 0.23 | 1.514 | 45.0 | 132.6 |
| | Fifth layer | 0.2 | 0.01 | 0.52 | 0.27 | 1.510 | 44.8 | 132.6 |
| System 3 | First layer | 0.4 | 0.2 | 0.4 | — | 1.526 | 46.9 | 136.0 |
| | Second layer | 0.38 | 0.13 | 0.42 | 0.07 | 1.521 | 46.6 | 136.0 |
| | Third layer | 0.37 | 0.05 | 0.44 | 0.14 | 1.515 | 46.2 | 136.0 |
| | Fourth layer | 0.16 | 0.04 | 0.48 | 0.32 | 1.505 | 45.6 | 136.0 |
| | Fifth layer | 0.1 | — | 0.5 | 0.4 | 1.499 | 45.3 | 136.1 |
| System 4 | First layer | 0.5 | 0.35 | 0.15 | — | 1.514 | 52.0 | 153.1 |
| | Second layer | 0.5 | 0.28 | 0.17 | 0.05 | 1.510 | 51.7 | 153.1 |
| | Third layer | 0.5 | 0.14 | 0.21 | 0.15 | 1.501 | 51.1 | 153.2 |
| | Fourth layer | 0.5 | 0.07 | 0.23 | 0.2 | 1.496 | 50.8 | 153.3 |
| | Fifth layer | 0.5 | — | 0.25 | 0.25 | 1.491 | 50.5 | 153.3 |
| System 5 | First layer | 0.6 | 0.17 | 0.02 | 0.21 | 1.484 | 56.5 | 173.1 |
| | Second layer | 0.74 | — | 0.04 | 0.22 | 1.478 | 56.1 | 173.5 |
| | Third layer | 0.67 | — | 0.06 | 0.27 | 1.476 | 55.8 | 173.1 |
| | Fourth layer | 0.59 | — | 0.08 | 0.33 | 1.472 | 55.5 | 173.2 |
| | Fifth layer | 0.5 | — | 0.1 | 0.4 | 1.468 | 55.3 | 173.6 |
| System 6 | First layer | 0.3 | 0.28 | — | 0.42 | 1.471 | 58.4 | 182.5 |
| | Second layer | 0.3 | 0.25 | 0.01 | 0.44 | 1.468 | 58.2 | 182.6 |

TABLE 1-continued

|  | Composition of stock solution (% by mass) | | | | Physical properties after curing | | |
| --- | --- | --- | --- | --- | --- | --- | --- |
|  | MMA | TDMA | BzMA | 8FM | Refractive index n | Abbe number v | n · v/(n − 1) |
| Third layer | 0.3 | 0.2 | 0.03 | 0.47 | 1.465 | 57.9 | 182.3 |
| Fourth layer | 0.3 | 0.08 | 0.07 | 0.55 | 1.456 | 57.2 | 182.9 |
| Fifth layer | 0.3 | — | 0.1 | 0.6 | 1.450 | 56.6 | 182.6 |

The central refractive index $n_0$ of the plastic rod lens of the present invention is preferably $1.4 \leq n_0 \leq 1.6$.

In the plastic rod lens of the present invention, a radius R is preferably between 0.08 mm or more and 0.4 mm or less. When the radius R is 0.4 mm or less, the conjugation length can be shortened, and thus the optical system can be made compact. In addition, by shortening the conjugation length, the color characteristics improve since the differences in the conjugation lengths at 470 nm and at 630 nm get even smaller.

On the other hand, in order to perform the processing or the handling when preparing a rod lens array or an image sensor, it is preferable that the radius R be 0.08 mm or more.

Additionally, in the plastic rod lens of the present invention, the refractive index distribution constant g at a wavelength of 525 nm is preferably $0.4 \text{ mm}^{-1} \leq g \leq 2.0 \text{ mm}^{-1}$. The length of one period of the plastic rod lens can be lengthened by making the refractive index distribution constant g 2.0 $\text{mm}^{-1}$ or less resulting in the easy processing and handling when preparing a rod lens array.

Since the length of one period of the plastic rod lens is shortened by making the refractive index distribution constant g $0.4 \text{ mm}^{-1}$ or more, the conjugation length Tc becomes small, and thus it is possible to achieve a compact optical system. By making the refractive index distribution constant g within the range described above, both a compact optical system and favorable handling properties of the plastic rod lens are achieved.

Additionally, in the plastic rod lens of the present invention, the product of the refractive index distribution constant g and the radius R (g·R) preferably satisfies the condition; i.e. $0.1 \leq g \cdot R \leq 0.3$. This makes it possible to achieve a plastic rod lens with a deep focal depth, a short conjugation length, and a large amount of outgoing light.

In order to enhance the lens performance by removing flare light or crosstalk light, a light absorber-containing layer containing a light absorber, which absorbs at least part of light having a wavelength in the region of visible light and near-infrared light, is preferably formed in the plastic rod lens of the present invention, in the cross-section perpendicular to the central axis, within a range of 80 μm or less from an outer circumferential surface of the plastic rod lens towards the central axis, and within a range of 0.6 R or more outside from the central axis.

Due to the formation of the light absorber-containing layer in the outer peripheral portion of the plastic rod lens as described above, it is possible, without considerably reducing the amount of outgoing light, to prevent flare light resulting from the part formed in the outer peripheral portion of the plastic rod lens where the refractive index distribution is irregular, or crosstalk when a rod lens array is formed. The amount of outgoing light reduces when a light absorber is contained in the region which is closer to the central axis than the point 0.6 R distant from the central axis, or when a light absorber is contained in the region where the distance from the outer circumferential surface of the plastic rod lens towards the central axis exceeds 80 μm.

Various dyes, colorants, and pigments, which may absorb light having a wavelength used in the optical system where the plastic rod lens is used, can be used as the light absorber in the present invention. These light absorbers are those which only absorb light in specific wavelength regions and it is also possible to combine two or more light absorbers which absorb light with different wavelengths. For example, when the lens is used in a color scanner in the form of a rod lens array, it is possible to combine several dyes for use, each of which absorbs light having respective RGB wavelengths. In addition, as the light absorber in the present invention, it is possible to use those which only absorb light in specific wavelength regions from visible light (about 400 nm to about 700 nm) to near-infrared light (about 700 nm to 1000 nm) as described above, or to use those which absorb light of all wavelengths. When forming a layer which absorbs all the light in the visible light region, those which are made black by mixing plural kinds of light absorbers, or those black light absorbers such as carbon black and graphite carbon can be used.

Additionally, the light absorber is preferably present as uniformly as much as possible in the light absorber-containing layer. In such a case, it is preferable that the light absorber molecules be uniformly dispersed or bound in the polymer constituting the light absorber-containing layer.

Further, the content of a light absorber in the light absorber-containing layer is preferably 0.001 to 10% by mass and more preferably 0.01 to 1% by mass.

A method favorably used for manufacturing the plastic rod lens of the present invention will be described.

The method for forming refractive index distributions of the plastic rod lens is not particularly limited and any methods such as an addition reaction, a copolymerization method, a gel polymerization method, a monomer volatilization method, and an interdiffusion method may be used. However, the interdiffusion method is preferable from the viewpoints of precision and productivity.

The interdiffusion method will be described.

An uncured laminated body (hereinafter referred to as a filament) is preformed where N items of uncured materials (refractive index n and Abbe number v after curing satisfy the formulae $n_1 > n_2 > \ldots > n_N$ and $v_1 > v_2 > \ldots > v_N$ ($N \geq 3$)) are laminated concentrically, with a configuration so that refractive indices and Abbe numbers sequentially reduce from the central axis to the outer peripheral portion, using a multi-component fiber-spinning nozzle. The filament is cured during or after the interdiffusion treatment of materials present in the adjacent layers so that the refractive index distribution between each layer of this filament is preferably continuous to obtain base fibers of the plastic rod lens (fiber-spinning process). Note that the interdiffusion treatment refers to a process which gives the filament a thermal history of a few seconds to a few minutes at 10° C. to 60° C. and more preferably at 20° C. to 50° C. under a nitrogen atmosphere.

In particular, it is preferable to use five layers of uncured materials where the composition of each layer from the first to fifth layers is as follows; the first layer containing
- (a) a monomer having a refractive index after curing of 1.50 to 1.54 and also an Abbe number after curing of 53 to 63: 20 to 45% by mass,
- (d) a monomer having a refractive index after curing of 1.48 to 1.50 and also an Abbe number after curing of 55 to 58: 55 to 80% by mass,
- (b) a monomer having a refractive index after curing of 1.55 to 1.65 and also an Abbe number after curing of 20 to 40: 0 to 5% by mass, and
- (c) a monomer having a refractive index after curing of 1.39 to 1.41 and also an Abbe number after curing of 62 to 68: 0 to 5% by mass;

the second layer containing
- the aforementioned component (a): 1 to 30% by mass,
- the aforementioned component (d): 20 to 80% by mass,
- the aforementioned component (b): 0 to 10% by mass, and
- the aforementioned component (d): 0 to 10% by mass;

the third layer containing
- the aforementioned component (a): 0 to 15% by mass,
- the aforementioned component (d): 50 to 80% by mass,
- the aforementioned component (b): 1 to 10% by mass, and
- the aforementioned component (d): 1 to 20% by mass;

the fourth layer containing
- the aforementioned component (a): 0 to 10% by mass,
- the aforementioned component (d): 50 to 80% by mass,
- the aforementioned component (b): 1 to 15% by mass, and
- the aforementioned component (c): 10 to 30% by mass; and the fifth layer containing
- the aforementioned component (d): 30 to 50% by mass,
- the aforementioned component (b): 5 to 30% by mass, and
- the aforementioned component (d): 20 to 50% by mass.

The plastic rod lens containing the component (d) has favorable features which are low production cost and high transparency and heat resistance. In addition, it is preferable to use five layers of uncured materials where refractive indices after curing and Abbe numbers after curing from the first to fifth layers are as follows;
first layer: refractive index of 1.500 to 1.510 and an Abbe number of 55.0 to 59.0,
second layer: refractive index of 1.490 to 1.500 and an Abbe number of 54.0 to 58.5,
third layer: refractive index of 1.480 to 1.495 and an Abbe number of 54.0 to 58.0,
fourth layer: refractive index of 1.475 to 1.485 and an Abbe number of 53.5 to 57.5, and
fifth layer: refractive index of 1.465 to 1.474 and an Abbe number of 53.0 to 55.5.

The aforementioned components (a) to (d) are preferably composed of the monomers which give the aforementioned building blocks (A) to (D), respectively.

The plastic rod lens of the present invention can be achieved by the following procedures. The base fibers of the plastic rod lens, in which a refractive index distribution is formed, are produced using the above method. Then the obtained base fibers of the plastic rod lens are subjected to heating/drawing treatments where necessary. Thereafter, a relaxation treatment is carried out. Lastly, the resultant is cut into a predetermined size where appropriate. In order to make the refractive index distribution of the obtained plastic rod lens become closer to an ideal distribution pattern, the item number N of the uncured materials used is preferably within the range of 4 to 6. When N=5, the ratio among the thicknesses of each layer from the first to fifth layers is preferably 5 to 30/15 to 50/15 to 40/10 to 25/0.5 to 10.

The viscosity of uncured materials is preferably $10^2$ to $10^7$ Pa·s. When the viscosity is too low, fibers are easily torn during the preforming process making it difficult to form a filament. Additionally, when the viscosity is too high, operability during the preforming process will be poor resulting in the possible impairment in the concentricity of each layer or filaments with large thickness plaques.

As a material constituting these uncured materials, a vinyl monomer which is radically polymerizable, or a composition composed of a vinyl monomer which is radically polymerizable and a polymer, which is soluble in the monomer, can be used.

In order to make the viscosity adjustment of the uncured materials easy when forming a filament from these uncured materials, and, in order to give the filament a refractive index distribution which is continuous from the central axis towards the outer peripheral portion, it is preferable that the uncured material be constituted of a composition which is composed of a monomer and a polymer, which is soluble in this monomer (a soluble polymer).

For the above polymer, those which are highly compatible with the polymers formed from the aforementioned building blocks (A) to (E) are used. For example, a polymethyl methacrylate (n=1.49), which is a polymer of the building block (D), or a copolymer (n=1.47 to 1.50) which is based on a polymethyl methacrylate is preferable.

It is preferable to use soluble polymers having the same refractive index in each layer for adjusting the viscosity of uncured materials since it is possible to achieve a plastic rod lens having a refractive index distribution which is continuous from the central axis towards the outer peripheral portion. In particular, a polymethyl methacrylate is favorable as a soluble polymer to be used when producing the plastic rod lens of the present invention for its excellent transparency and high refractive index.

It is preferable to add 0.01 to 2% by mass of a polymerization initiator (F) in the uncured material in order to cure a filament formed from the uncured material. Both a heat-curing initiator and a photo-curing initiator can be used as the polymerization initiator (F).

Peroxide-based or azo-based initiators are usually used as a heat-curing initiator. Examples of the photo-curing initiators include benzophenone, benzoin alkyl ether, 4'-isopropyl-2-hydroxy-2-methylpropiophenone, 1-hydroxycyclohexylphenylketone, benzyl methyl ketal, 2,2-diethoxyacetophenone, chlorothioxanthone, thioxanthone-based compounds, benzophenone-based compounds, ethyl 4-dimethylaminobenzoate, isoamyl 4-dimethylaminobenzoate, N-methyldiethanolamine, and triethylamine.

In order to cure the uncured materials, a filament containing a heat-curing initiator and/or a photo-curing initiator is subjected to a heat treatment or a photo-curing treatment. When the uncured materials contain both heat-curing and photo-curing initiators, both heat- and photo-curing treatments can be carried out.

The photo-curing treatment can be performed by irradiating ultraviolet radiation from the surroundings onto the uncured material containing a photo-curing initiator. Examples of a light source used in the photo-curing treatment include a carbon arc lamp which emits light having a wavelength of 150 to 600 nm, a high pressure mercury lamp, a medium pressure mercury lamp, a low pressure mercury lamp, an ultrahigh pressure mercury lamp, a chemical lamp, a xenon lamp, and laser light.

The photo-curing treatment can be performed by subjecting the uncured material containing a heat-curing initiator in a curing section, such as a heating furnace where it is controlled to a constant temperature, for a predetermined time.

In order to stably produce filaments, it is preferable to add a polymerization inhibitor for preventing the polymerization until the curing treatment is performed. Examples of the polymerization inhibitors include quinone compounds such as hydroquinone and hydroquinone monomethyl ether, amine-based compounds such as phenothiazine, and N-oxyl-based compounds such as 4-hydroxy-2,2,6,6-tetramethylpiperidine-N-oxyl.

The base fibers of the plastic rod lens obtained by curing a filament may be transferred directly and continuously to a heating/drawing process, or be collected around a bobbin or the like first and then transferred to the heating/drawing process. The heating/drawing process can be carried out in a batch system or in a continuous system. It is preferable to carry out a relaxation process after the heating/drawing process. The heating/drawing and relaxation processes may be carried out continuously or each process may be carried out separately.

The heating/drawing process can be carried out using a known method. Examples thereof include a method to first supply the base fibers of the plastic rod lens obtained by curing to a heating furnace using a first nip roller, and then drawing the base fibers of the plastic rod lens which passed through the heating furnace by receiving them with a second nip roller at a rate faster than that with the first nip roller. The temperature of a heating atmosphere in the heating/drawing process is set, where appropriate, depending on the material of the plastic rod lens or the like. However, it is preferable that the temperature be set at a temperature 20° C. higher than the glass transition temperature (Tg) of the plastic rod lens or higher. In addition, the draw ratio is determined, where appropriate, depending on the desired diameter of the plastic rod lens. The ratio can be adjusted by a ratio between the peripheral velocities of the first and second nip rollers.

The relaxation process can be carried out using a known method. Examples thereof include a method to first supply the drawn base fibers of the plastic rod lens obtained to a heating furnace using a third nip roller, and then receiving the base fibers of the plastic rod lens which passed through the heating furnace with a fourth nip roller at a rate slower than that with the third nip roller to relax. The temperature of a heat atmosphere in the relaxation process is set, where appropriate, depending on the material of the plastic rod lens or the like. However, it is preferable that the temperature be equal to the glass transition temperature (Tg) of the plastic rod lens or higher. Moreover, it is preferable to render the relaxation rate (i.e. length before the relaxation treatment/length after the relaxation treatment) about 99/100 to about 3/5 although it is determined, where appropriate, depending on the desired diameter of the plastic rod lens. It is possible to suppress the contraction of the plastic rod lens by performing the relaxation process. Additionally, when the relaxation rate is too low, it is not preferable since the plaque of the lens diameter is large. The relaxation ratio can be adjusted by a ratio between the peripheral velocities of the third and fourth nip rollers.

The molecular weight of the plastic rod lens ultimately obtained is preferably 10000 to 100000.

Figure 1:
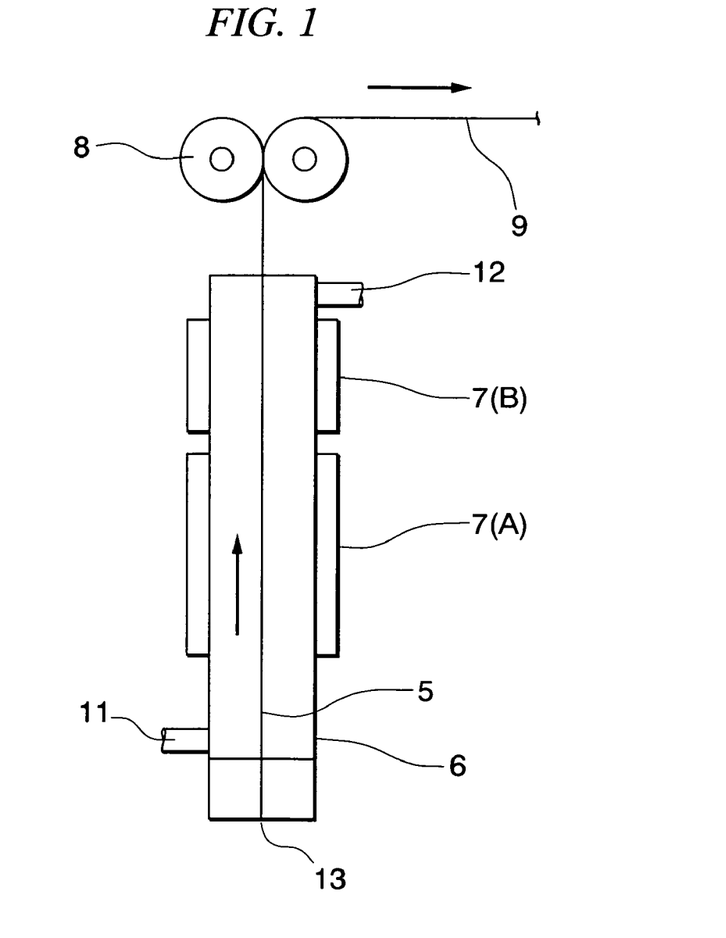
FIG. 1 is a schematic diagram showing an apparatus for manufacturing base fibers of a plastic rod lens.
Figure 2:
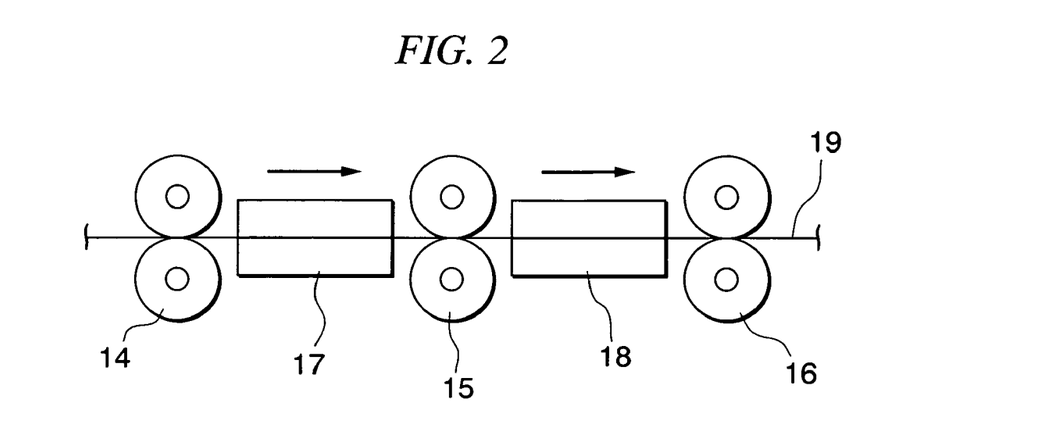
FIG. 2 is a schematic diagram showing an apparatus for carrying out heating/drawing and relaxation treatments on the base fibers of the plastic rod lens.

FIGS. 1 and 2 show one example of an apparatus for manufacturing the base fibers of the plastic rod lens of the present invention.

FIG. 1 is a schematic diagram of the apparatus for manufacturing the base fibers of the plastic rod lens of the present invention, and shows longitudinal sectional views of an interdiffusion section and a curing section. In FIG. 1, reference numerals 13, 5, 6, 7(A), 7(B), 8, 9, 11, and 12 refer to a concentric, multi-component fiber-spinning nozzle; an uncured filament which is extruded; the interdiffusion section to give a continuous refractive index distribution by mutually diffusing the monomers in each layer which constitutes the filament; the curing section for curing uncured materials; a pull roller; base fibers of a plastic rod lens; an inert-gas inlet; and an inert-gas outlet, respectively.

In order to remove volatile materials, such as monomers liberated from the filament 5, from the interdiffusion section 6 and the curing section 7, an inert gas such as nitrogen gas is introduced from the inert-gas inlet 11 and discharged from the inert-gas outlet 12.

The obtained base fibers of the plastic rod lens 9 are supplied to the apparatus shown in FIG. 2 which carries out heating/drawing and relaxation treatments continuously from the abovementioned manufacturing apparatus or after once being collected around a bobbin or the like. In the apparatus shown in FIG. 2, the heating/drawing treatments are carried out in a heating furnace 17 between a first pull roller 14 and a second pull roller 15, and the relaxation treatment is carried out in a heating furnace 18 between the second pull roller 15 and a third pull roller 16. Those with a known structure can be used as the heating furnaces 17 and 18.

The base fibers of the plastic rod lens obtained as described so far may be cut into a desired length directly and continuously, or may be first collected around a bobbin or the like and then the cutting is carried out.

Next, a rod lens array of the present invention will be described.

The rod lens array of the present invention is configured by arranging a plurality of the plastic rod lenses of the present invention in one or more lines in parallel between two substrates. An adhesive or the like is used for fixing the plastic rod lenses and the substrates. The adjacent plastic rod lenses may be adhered to each other or may be arranged with a constant gap, and in the latter case, the gap between one plastic rod lens and another is preferably constant. In addition, when forming a rod lens array where two or more layers of plastic rod lenses are arranged, it is preferable that they be arranged into a pyramid shape so that the size of the gaps between the two plastic rod lenses is minimum.

Since the rod lens array of the present invention has a small chromatic aberration, it is possible to form a color image sensor, in which differences in the conjugation lengths for the light having different wavelengths are small, and which has excellent color characteristics and a high resolution.

The rod lens array of the present invention is manufactured by a known method. For example, the plastic rod lenses cut into a predetermined length are arranged in parallel and fixed between the two substrates so that the plastic rod lenses are adhered to each other. In this state, an adhesive containing a light-shielding agent such as carbon black is injected in the gap formed between the plastic rod lens and the substrate to cure. Then, this rod lens array is cut into a desired length where necessary and the edge faces formed are subjected to a mirror-finish treatment such as cutting using a diamond blade.

Next, the rod lens plate of the present invention will be described.

The rod lens plate of the present invention is configured by arranging a plurality of the plastic rod lenses of the present invention so that optical-axis directions of the plastic rod lenses become parallel to each other, and the plastic rod lenses are arranged in two different directions on a plane perpendicular to the optical axes of the plastic rod lenses. An adhesive or the like is used for the fixation between the plastic rod lenses. The adjacent plastic rod lenses may be adhered to each other to arrange into a pyramid shape or may be arranged with a constant gap. In this case, the gap between one plastic rod lens and another is preferably constant.

Since the rod lens plate of the present invention is arranged in two dimensions, it can be used for an image sensor or the like which reads information on a wide area. In addition, since the rod lens plate of the present invention has a small chromatic aberration, it can be used for a color image sensor with a high resolution.

The rod lens plate of the present invention is manufactured by a known method. For example, plastic rod lenses which are cut into a uniform length are arranged in parallel into a pyramid shape two-dimensionally so that the plastic rod lenses are adhered to each other to fix. In this state, an adhesive containing a light-shielding agent such as carbon black is injected in the gap formed between the plastic rod lenses to cure. Then, this rod lens plate is cut into a desired length where necessary and the edge faces formed are subjected to a mirror-finish treatment using methods such as diamond cutting and optical polishing. Additionally, it is also possible to apply an antireflection coating in order to reduce the amount of light loss due to the reflection at the edge faces of the rod lens plate.

Next, the image sensor of the present invention will be described.

The image sensor of the present invention has, as a basic configuration, a photoelectric conversion element which receives light and converts it to an electrical signal, a light source for illuminating a read manuscript, and the rod lens array or the rod lens plate of the present invention which forms an image on the aforementioned photoelectric conversion element using the reflected light from the read manuscript. The sensor may also be equipped with a cover glass or the like for fixing the manuscript stably.

The light source used in the image sensor of the present invention is for illuminating the manuscript surface. An incandescent lamp, a cold-cathode tube, an LED, or the like is used as the light source and the LED is used preferably since light with a specific wavelength is readily used. These light sources may be combined with a filter element for the sake of screening out light with a specific wavelength.

The image sensor of the present invention can be made into a color image sensor using plural kinds of LEDs with different emission wavelengths. In this case, it is preferable that the light source be configured from plural kinds of LEDs with different emission wavelengths which correspond to three colors; i.e. blue, green, and red, respectively. When the image sensor is used as a color image sensor, peak emission wavelengths are preferably 450 to 480 nm (blue), 510 to 560 nm (green), and 600 to 660 nm (red), respectively, in order to improve color reproducibility. In an illuminating device which is provided with such light sources, it is configured so that light is made incident from the light source on a light guiding body and the outgoing light from the light guiding body illuminates the manuscript surface.

For example, an illuminating device is configured from an RGB three-color LED light source where LED elements of three colors which are light sources; i.e. a red (R) LED element, a green (G) LED element, and a blue (B) LED element are packaged into one, and a light guiding body which is formed from a member such as an acrylic resin which has excellent optical transparency. The RGB three-color LED light source is arranged so that light is made incident on the light guiding body from one side of an edge of the light guiding body in the longitudinal direction or from both sides thereof. The incident light propagates through the light guiding body while repeating the total reflection at the interfaces between the light guiding body and air.

The operation of the image sensor of the present invention will be described using a color image sensor as an example. The manuscript, which is supported by being pressed against a cover glass, is sequentially illuminated with three colors of light (that is, R, G, and B) by switching from one light to another from an oblique direction using an illuminating device. The light reflected from the manuscript and having color information of three colors (that is, R, G, and B) is image-formed on a photoelectric conversion element by the rod lens array. The photoelectric conversion element converts the light having color information of three colors (that is, R, G, and B) into electrical signals. The image information converted to the electrical signals is transmitted to a system section which is provided with a computer or the like, and a color image is reproduced by processing the electrical signals of three colors (that is, R, G, and B) in the system section.

Since the image sensor of the present invention has excellent color characteristics, it is capable of reading clear color images, and thus can be used for a color scanner with a high resolution or the like.

Next, the printer of the present invention will be described.

The printer of the present invention is configured using the rod lens array or the rod lens plate of the present invention. For example, it is configured from an LED chip where LEDs, which are light sources, are arranged in an array, the rod lens array or the rod lens plate of the present invention, and a photoreceptor or a sensitive film (a photographic paper). It is a system where image information is written on a photoreceptor or a sensitive film using light sources of three primary colors.

Since the printer of the present invention uses the rod lens array or the rod lens plate of the present invention, it has a small chromatic aberration, and the extent of blurring of each color when writing in three primary colors is small. For this reason, the printer can be used as a color printer with a high resolution or a photo printer.

Additionally, the light source in the printer of the present invention is not limited to an LED array and light sources such as a liquid crystal shutter and an electroluminescence array can also be used.

EXAMPLES

The present invention will be described in detail below using Examples. As a polymethylmethacrylate, one which had a viscosity $[\eta]$=0.40 [P] (measured in MEK at 25° C.) was used in Examples. 1-Hydroxycyclohexyl phenyl ketone and hydroquinone (HQ) were used as a photo-curing initiator and a polymerization inhibitor, respectively.

In addition, measurements of physical properties were made as follows.

<Refractive Index Distribution>

An interphako interference microscope manufactured by Carl Zeiss, Inc. was used for the measurement.

<Conjugation Length (Tc) and Resolution (MTF)>

By using a grid pattern having a spatial frequency of 12 (line pair/mm, Lp/mm), light from the light source was made incident through the grid pattern on the rod lens array where both edge faces perpendicular to the optical axis were polished. Grid images were read by a CCD line sensor installed on an imaging plane and the maximum value (imax) and the minimum value (imin) of the amount of light measured were measured. An MTF (modulation transfer function) was determined using the following formula.

MTF(%)={(imax−imin)/(imax+imin)}×100

During this process, the distance between the grid pattern and the end of the rod lens array where light was made incident, and the distance between the end of the rod lens array where light went out and the CCD line sensor were made equal. Then MTF was measured by moving the grid pattern and the CCD line sensor symmetrically relative to the rod lens array, and the conjugation length was defined as a distance between the grid pattern and the CCD line sensor when the best MTF was achieved.

Example 1

Stock solutions for each layer were prepared as shown in Table 2 below.

spinning nozzle. The temperature of the multi-component fiber-spinning nozzle was 50° C. The discharge ratio of each layer was, when converted to the ratio among the thicknesses of each layer in the radius direction of the plastic rod lens (the radius for the first layer), first layer thickness/second layer thickness/third layer thickness/fourth layer thickness/fifth layer thickness=21/25/33/19/2.

Subsequently, the filament extruded from the multi-component fiber-spinning nozzle was received by a nip roller (200 cm/minute) and then passed through an interdiffusion treatment section having a length of 30 cm. Then the filament was made to pass over the center of a first curing section (first light-irradiation section), which had a length of 60 cm and in which 18 chemical lamps of 20 W were provided continuously on two steps around the central axis at an equal interval, to cure. Further, the filament was made to pass over the center of a second curing section (second light-irradiation section) where three high pressure mercury lamps of 2.0 kW were provided around the central axis at an equal interval to cure completely. The flow rate of nitrogen in the interdiffusion

TABLE 2

| | | Composition of stock solution (% by mass) | | | | | Physical properties after curing | | | |
|---|---|---|---|---|---|---|---|---|---|---|
| | | PMMA | MMA | TDMA | BzMA | 8FM | Refractive index n | Abbe number ν | K | Kmax. − Kmin. |
| Ex. 1 | First layer | 46 | 24 | 30 | — | — | 1.502 | 55.7 | 166.66 | 1.90 |
| | Second layer | 46 | 29 | 15 | 5 | 5 | 1.497 | 54.7 | 164.76 | |
| | Third layer | 49 | 37 | — | 6 | 8 | 1.490 | 54.8 | 166.64 | |
| | Fourth layer | 47 | 23 | — | 10 | 20 | 1.484 | 54.2 | 166.18 | |
| | Fifth layer | 39 | 3 | — | 17 | 41 | 1.472 | 53.2 | 165.91 | |
| Comp. Ex. 1 | First layer | 47 | 23 | 30 | — | — | 1.502 | 55.7 | 166.66 | 19.65 |
| | Second layer | 50 | 40 | 10 | — | — | 1.496 | 55.9 | 168.60 | |
| | Third layer | 50 | 40 | — | — | 10 | 1.485 | 56.6 | 173.30 | |
| | Fourth layer | 50 | 40 | — | — | 10 | 1.485 | 56.6 | 173.30 | |
| | Fifth layer | 42 | 18 | — | — | 40 | 1.460 | 58.7 | 186.31 | |

Each layer contains 0.25% by mass of a photo-curing catalyst and 0.1% by mass of HQ.
K = n · ν/(n − 1), Kmax. = maximum value among the values of K in the first to fifth layers, and Kmin. = minimum value among the values of K in the first to fifth layers.

Note that in order to suppress crosstalk light or flare light, a dye Blue ACR (manufactured by Nippon Kayaku Co., Ltd.), a dye Blue 4 G (manufactured by Mitsubishi Chemical Corporation), a dye MS Yellow HD-180 (manufactured by Mitsui Toatsu Dye, Ltd.), a dye MS Magenta HM-1450 (manufactured by Mitsui Toatsu Dye, Ltd.), and a dye KAYASORB CY-10 (manufactured by Nippon Kayaku Co., Ltd.) were added in each of the stock solutions for the fourth and fifth layers before heating/mixing as shown in the following table relatively to the overall stock solutions.

TABLE 3

| Dye | Fourth layer (% by mass) | Fifth layer (% by mass) |
|---|---|---|
| Blue ACR | 0.014 | 0.571 |
| Blue 4G | 0.011 | 0.011 |
| MS Magenta HM-1450 | 0.014 | 0.143 |
| MS Yellow HD-180 | 0.014 | 0.143 |
| KAYASORB CY-10 | 0.011 | 0.011 |

Then each layer was heated to 70° C., mixed, and arranged so that the refractive indices after curing will be lowered sequentially from the center, and then 5 concentric layers were extruded simultaneously from a multi-component fiber-treatment section was 80 L/minute. The diameter of the obtained base fibers of the plastic rod lens was 0.295 mm.

Figure 3:
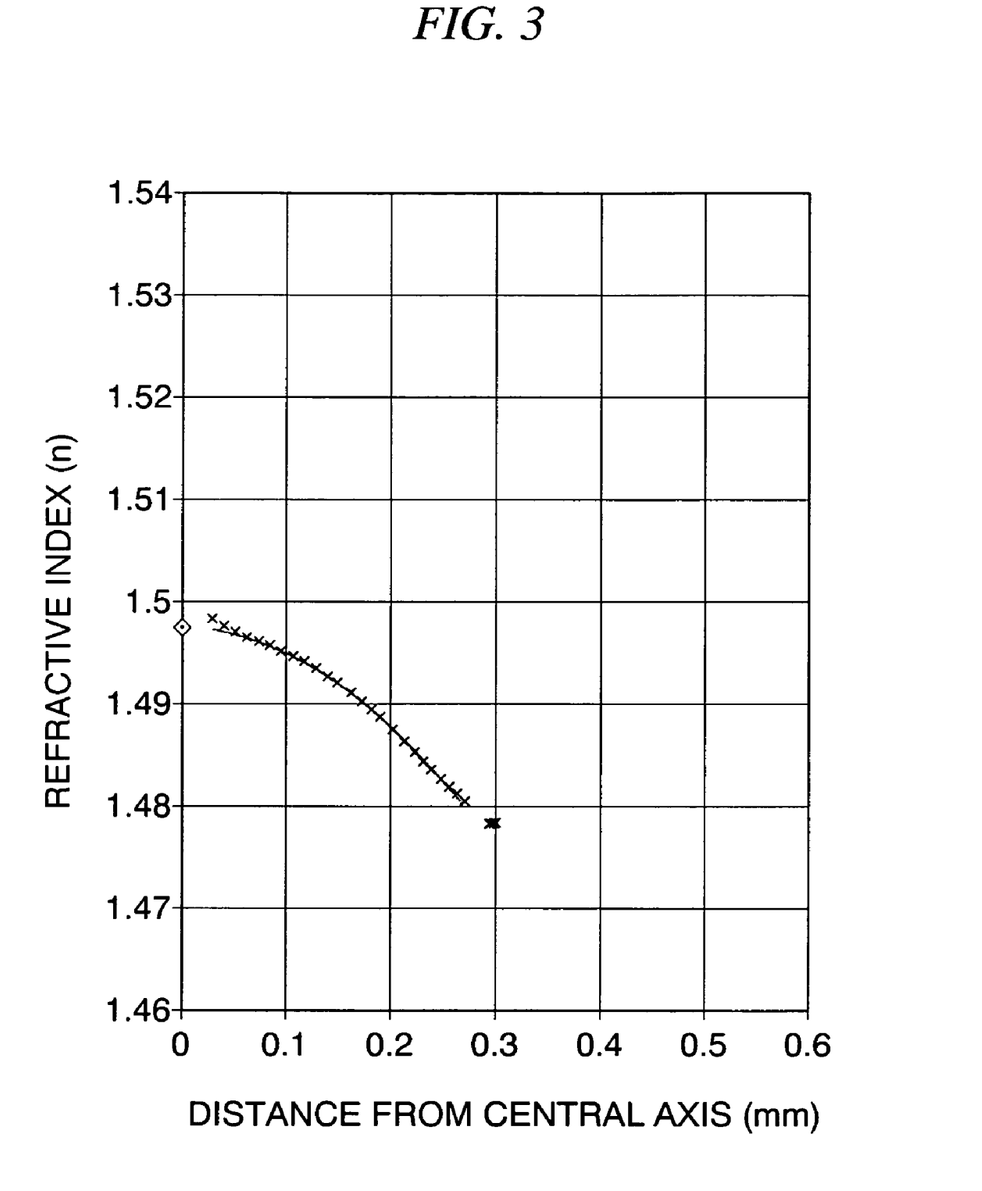
FIG. 3 is a diagram showing a refractive index distribution of the base fibers of the plastic rod lens in Example 1.

The refractive index distribution of the base fibers of the plastic rod lens which were prepared by the same method except that an outer peripheral portion therein did not contain any dyes, was measured and shown in FIG. 3. The refractive index at the center was 1.497 and the refractive index in the outer peripheral portion was 1.478, and thus refractive indices were continuously reducing towards the outer peripheral portion. It is considered that the refractive index distribution is also similar even when dyes are contained in the outer peripheral portion.

These base fibers of the plastic rod lens were drawn 3.57-fold under an atmosphere of 135° C., and then subjected to a relaxation treatment under an atmosphere of 115° C. so that the relaxation rate was 510/714.

The radius R of the obtained plastic rod lens was 0.185 mm and the central refractive index was 1.497. The refractive index distribution within the distance range of 0.2 R to 0.8 R from the central axis towards the outer peripheral portion approximated to the following formula (5), and the refractive index distribution constant g at a wavelength of 525 nm was 0.84 mm$^{-1}$.

In addition, a layer was formed which had a thickness of about 40 μm from an outer circumferential surface of the plastic rod lens towards the central part and in which dyes were mixed almost uniformly.

Numerous plastic rod lenses obtained were arranged in parallel in one line between two substrates made of a phenolic resin so as to adhere to one another (at an interval of 0.37 mm), the gaps therebetween were filled with an adhesive ("Araldite rapid" manufactured by Vantico Ltd.), and the adhesive between the plastic rod lenses and between the plastic rod lens and the substrates was cured. Thereafter, both edge faces of the plastic rod lens were subjected to a mirror cutting using a diamond blade at a plane perpendicular to the central axis of the plastic rod lens, and the rod lens array having a length of the plastic rod lens of 4.4 mm was manufactured. The conjugation length Tc of this rod lens array at 525 nm was 9.8 mm and MTF at this time point was 72.6%.

Tc values of this rod lens array at each wavelength of 470 nm, 525 nm, and 630 nm were measured (Table 8). Additionally, when MTFs of the three wavelengths at a certain Tc were compared, Tc at which the minimum MTF became maximum was 9.8 mm. The MTFs of each wavelength were measured at this Tc of 9.8 mm where the most excellent color characteristics were achieved (Table 8).

Comparative Example 1

Stock solutions of each layer were prepared as shown in the aforementioned Table 2. Dyes were added to the fourth and fifth layers as shown in the following Table 4.

TABLE 4

| Dye | Fourth layer (% by mass) | Fifth layer (% by mass) |
| --- | --- | --- |
| Blue ACR | 0.571 | 0.571 |
| Blue 4G | 0.023 | 0.023 |
| MS Magenta HM-1450 | 0.143 | 0.143 |
| MS Yellow HD-180 | 0.143 | 0.143 |
| KAYASORB CY-10 | 0.023 | 0.023 |

These five kinds of stock solutions were heated to 70° C., mixed, and arranged so that the refractive indices after curing will be lowered sequentially from the center, and then 5 concentric layers were extruded simultaneously from a multi-component fiber-spinning nozzle. The temperature of the multi-component fiber-spinning nozzle was 40° C. The discharge ratio of each layer was, when converted to the ratio among the thicknesses of each layer in the radius direction of the plastic rod lens (the radius for the first layer), first layer thickness/second layer thickness/third layer thickness/fourth layer thickness/fifth layer thickness=18/50/29/2/1.

Subsequently, the filament was received by a nip roller as in Example 1 and was subjected to interdiffusion and curing treatments to obtain the base fibers of a plastic rod lens. The diameter of the obtained base fibers of the plastic rod lens was 0.24 mm.

These base fibers of the plastic rod lens were drawn 2.2-fold under an atmosphere of 135° C., and then subjected to a relaxation treatment under an atmosphere of 150° C. so that the relaxation rate was 10/11.

The radius R of the obtained plastic rod lens was 0.17 mm and the central refractive index was 1.497. The refractive index distribution within the distance range of 0.2 R to 0.8 R from the central axis towards the outer peripheral portion approximated to the following formula (5), and the refractive index distribution constant g at a wavelength of 525 nm was 0.84 mm$^{-1}$.

In addition, a layer was formed which had a thickness of about 5 μm from an outer circumferential surface of the plastic rod lens towards the central part and in which dyes were mixed almost uniformly.

The rod lens array having a length of the plastic rod lens of 4.4 mm was manufactured using a plurality of plastic rod lenses obtained as in Example 1 except the interval between the plastic rod lenses was changed from 0.37 mm to 0.34 mm. The conjugation length Tc of this rod lens array at 525 nm was 10.0 mm and MTF at this time point was 65.0%.

Tc values of this rod lens array at each wavelength of 470 nm, 525 nm, and 630 nm were measured and shown in the following Table 8. Additionally, when MTFs of the three wavelengths at a certain Tc were compared, Tc at which the minimum MTF became maximum was 10.1 mm. The MTFs of each wavelength measured at this Tc of 10.1 mm are shown in Table 8.

Example 2

A plastic rod lens was manufactured as in Example 1 except that the draw ratio and the relaxation rate were changed to 3.50-fold and 500/700, respectively.

The radius R of the obtained plastic rod lens was 0.187 mm and the central refractive index was 1.497. The refractive index distribution within the distance range of 0.2 R to 0.8 R from the central axis towards the outer peripheral portion approximated to the following formula (5), and the refractive index distribution constant g at a wavelength of 525 nm was 0.84 mm$^{-1}$.

Then a rod lens array was manufactured as in Example 1 except that the interval between the plastic rod lenses was changed from 0.37 mm to 0.39 mm, and the adhesive was changed from Araldite rapid to "Esudain 9607K" manufactured by Sekisui Fuller Co., Ltd. The conjugation length Tc of this rod lens array at 525 nm was 10.0 mm and MTF at this time point was 72.6%.

Tc values of this rod lens array at each wavelength of 470 nm, 525 nm, and 630 nm were measured (Table 8). Additionally, when MTFs of the three wavelengths at a certain Tc were compared, Tc at which the minimum MTF became maximum was 10.0 mm. The MTFs of each wavelength were measured at this Tc of 10.0 mm where the most excellent color characteristics were achieved (Table 8).

Example 3

A plastic rod lens and a rod lens array were manufactured as in Example 2 except that the amount of dyes added in the fourth layer was changed as shown in the following Table 5.

TABLE 5

| Dye | Fourth layer (% by mass) |
| --- | --- |
| Blue ACR | 0.003 |
| Blue 4G | 0.003 |
| MS Magenta HM-1450 | 0.003 |
| MS Yellow HD-180 | 0.006 |
| KAYASORB CY-10 | 0.003 |

The radius R of the obtained plastic rod lens was 0.187 mm and the central refractive index was 1.497. The refractive index distribution within the distance range of 0.2 R to 0.8 R from the central axis towards the outer peripheral portion approximated to the formula (5), and the refractive index distribution constant g at a wavelength of 525 nm was 0.84 mm$^{-1}$.

The conjugation length Tc of this rod lens array at 525 nm was 10.0 mm and the MTF at this time point was 62.4%.

Tc values of this rod lens array at each wavelength of 470 nm, 525 nm, and 630 nm were measured (Table 8). Additionally, when MTFs of the above three wavelengths at a certain Tc were compared, Tc at which the minimum MTF became maximum was 10.0 mm. The MTFs of each wavelength were measured at this Tc of 10.0 mm where the most excellent color characteristics were achieved (Table 8).

Comparative Example 2

A rod lens array was manufactured as in Comparative Example 1 except that the interval between the plastic rod lenses was changed from 0.34 mm to 0.36 mm, and the adhesive was changed to Esudain 9607K.

(Light Amount Measurement)

The amount of light on the optical axes was measured while being scanned using a white light source and an image sensor in the arrangement direction of the rod lens array (longitudinal direction), and the average value at each measuring point was taken as the light amount. The amounts of light each having a wavelength of 470, 525, and 630 in the rod lens array of Example 2 were respectively defined as a value of 100, and those for Examples 2 and 3 and Comparative Example 2 were measured for the comparison shown in Table 8.

Example 4

Stock solutions for each layer were prepared as shown in Table 6 below.

was, when converted to the ratio among the thicknesses of each layer in the radius direction of the plastic rod lens (the radius for the first layer), first layer thickness/second layer thickness/third layer thickness/fourth layer thickness/fifth layer thickness=6/40/35.5/17/1.5.

Subsequently, the filament extruded from the multi-component fiber-spinning nozzle was received by a nip roller (200 cm/minute) and then passed through an interdiffusion treatment section having a length of 30 cm. Then the filament was made to pass over the center of a first curing section (first light-irradiation section), which had a length of 60 cm and in which 18 chemical lamps of 20 W were provided continuously on two steps around the central axis at an equal interval, to cure. Further, the filament was made to pass over the center of a second curing section (second light-irradiation section) where three high pressure mercury lamps of 2.0 kW were provided around the central axis at an equal interval to cure completely. The flow rate of nitrogen in the interdiffusion treatment section was 84 L/minute. The diameter of the obtained base fibers of the plastic rod lens was 0.298 mm.

Figure 4:
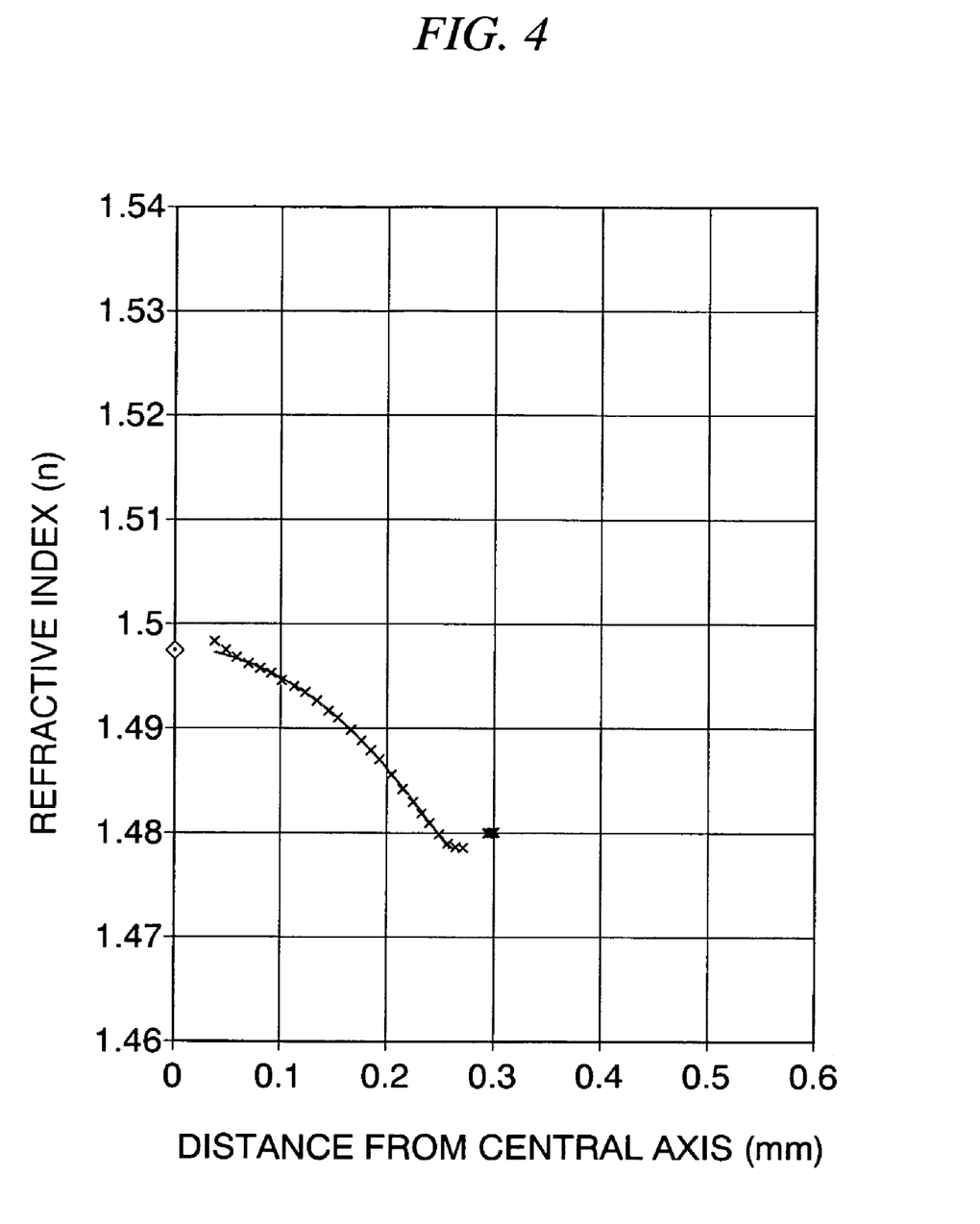
FIG. 4 is a diagram showing a refractive index distribution of the base fibers of the plastic rod lens in Example 4.

The refractive index distribution of the obtained base fibers of the plastic rod lens was measured and shown in FIG. 4. The refractive index at the center was 1.498 and the refractive index in the outer peripheral portion was 1.48, and thus refractive indices were continuously reducing towards the outer peripheral portion.

These base fibers of the plastic rod lens were drawn 2.69-fold under an atmosphere of 135° C., and then subjected to a relaxation treatment under an atmosphere of 118° C. so that the relaxation rate was 430/538.

The radius R of the obtained plastic rod lens was 0.205 mm and the central refractive index was 1.498. The refractive index distribution within the distance range of 0.2 R to 0.8 R from the central axis towards the outer peripheral portion

TABLE 6

| | | Composition of stock solution (% by mass) | | | | Physical properties after curing | | | |
|---|---|---|---|---|---|---|---|---|---|
| | | PMMA | MMA | TDMA | BzMA | 8FM | Refractive index n | Abbe number v | K | Kmax. – Kmin. |
| Ex. 4 | First layer | 40 | 20.8 | 35 | 0.8 | 3.4 | 1.498 | 57.7 | 173.73. | 0.365 |
| | Second layer | 43 | 28.6 | 21 | 0.8 | 6.6 | 1.492 | 57.2 | 173.45 | |
| | Third layer | 44.6 | 31 | 11 | 1.4 | 12 | 1.487 | 56.9 | 173.69 | |
| | Fourth layer | 44 | 21.1 | 3.5 | 5.4 | 26 | 1.477 | 56.1 | 173.82 | |
| | Fifth layer | 37 | 1 | — | 13 | 49 | 1.462 | 54.9 | 173.68 | |

Note that dyes were added as shown in the following Table 7.

TABLE 7

| Dye | Fifth layer (% by weight) |
|---|---|
| Blue ACR | 0.571 |
| Blue 4G | 0.011 |
| MS Magenta HM-1450 | 0.143 |
| MS Yellow HD-180 | 0.143 |
| KAYASORB CY-10 | 0.011 |

Then each layer was heated to 70° C., mixed, and arranged so that the refractive indices after curing will be lowered sequentially from the center, and 5 concentric layers were extruded simultaneously from a multi-component fiber-spinning nozzle. The temperature of the multi-component fiber-spinning nozzle was 55° C. The discharge ratio of each layer approximated to the formula (5), and the refractive index distribution constant g at a wavelength of 525 nm was 0.84 mm$^{-1}$.

In addition, a layer was formed which had a thickness of about 3 μm from an outer circumferential surface of the plastic rod lens towards the central part and in which dyes were mixed almost uniformly.

Numerous plastic rod lenses obtained were arranged in parallel in one line between two substrates made of a phenolic resin so as to adhere to one another (at an interval of 0.43 mm), the gaps therebetween were filled with an adhesive (Esudain 9607K), and the adhesive between the plastic rod lenses and between the plastic rod lens and the substrates was cured. Thereafter, both edge faces of the plastic rod lens were subjected to a mirror cutting using a diamond blade at a plane perpendicular to the central axis of the plastic rod lens, and the rod lens array having a plastic rod lens with a length of 4.4 mm was manufactured. The conjugation length Tc of this rod lens array at 525 nm was 9.9 mm and MTF at this time point was 57.2%.

Tc values of this rod lens array at each wavelength of 470 nm, 525 nm, and 630 nm were measured (Table 8). Additionally, when MTFs of the above three wavelengths at a certain Tc were compared, Tc at which the minimum MTF became maximum was 9.9 mm. The MTFs of each wavelength were measured at this Tc of 9.9 mm where the most excellent color characteristics were achieved (Table 8).

The amount of light of this rod lens array was measured and was compared to the amounts of light each having a wavelength of 470, 525, and 630 nm of the rod lens array in Example 2, which were defined as a value of 100, respectively (Table 8).

TABLE 8

|  | Tc [mm] | | | | MTF [%] | | | Ratio of light amount | | |
| --- | --- | --- | --- | --- | --- | --- | --- | --- | --- | --- |
|  | 470 nm | 525 nm | 630 nm | ΔTc | 470 nm | 525 nm | 630 nm | 470 nm | 525 nm | 630 nm |
| Ex. 1 | 9.8 | 9.8 | 9.9 | 0.1 | 70.7 | 72.6 | 73.4 | Not determined | | |
| Comp. Ex. 1 | 9.8 | 10.0 | 10.4 | 0.6 | 55.0 | 64.0 | 55.0 | Not determined | | |
| Ex. 2 | 10.0 | 10.0 | 10.1 | 0.1 | 70.7 | 72.6 | 73.4 | 100 | 100 | 100 |
| Ex. 3 | 10.0 | 10.0 | 10.1 | 0.1 | 62.4 | 62.4 | 63.0 | 122 | 127 | 125 |
| Comp. Ex. 2 | 9.8 | 10.0 | 10.4 | 0.6 | 55.0 | 64.0 | 55.0 | 127 | 124 | 133 |
| Ex. 4 | 9.8 | 9.99 | 10.1 | 0.3 | 53.7 | 57.2 | 54.0 | 174 | 168 | 173 |

The chromatic aberrations ΔTc (differences between Tc (470) and Tc (630)) of the rod lens arrays of Examples 1 to 4 were small ranging from 0.1 to 0.3 mm. Moreover, variations in the MTF at each wavelength were small.

The chromatic aberration ΔTc of the rod lens array of Comparative Example 1 was 0.6 mm and was large. In addition, variations in the MTF at each wavelength were large due to the large chromatic aberration. Moreover, the MTFs at the wavelengths of 630 nm and 470 nm were 15% or more inferior to the MTF at respective wavelengths in Example 1.

The plastic rod lenses of Examples 3 and 4 suppressed chromatic aberrations ΔTc and the variations in the MTF at each wavelength, and also had an excellent brightness. In particular, in the plastic rod lens of Example 4, radius R could be made large since the differences in the refractive indices at the central axis and in the outer peripheral portion were large. Furthermore, it was possible to make a region, in which the light beam transmits (effective diameter), large and to make the amount of light high by reducing the thickness of a layer where dyes were present.

INDUSTRIAL APPLICABILITY

According to the present invention, it is possible to obtain a plastic rod lens with a small chromatic aberration and which has excellent color characteristics, a rod lens array, and a rod lens plate. In addition, by using such a rod lens array or a rod lens plate, it is possible to obtain a color image sensor having a high resolution or a color printer having a high resolution.

The invention claimed is:

1. A plastic rod lens having a cylindrical shape with a radius R comprising:
   a central axis; and
   an outer peripheral portion,
   wherein a refractive index $n_D$ decreases from the central axis to the outer peripheral portion, and the following requirements (1) to (3) are met:

$$43 \leq v_1 \leq 60 \quad (1)$$

$$|\{n_A \times v_A/(n_A-1)\} - \{n_B \times v_B/(n_B-1)\}| < 5 \quad (2)$$

$$n_0 - n_1 \geq 0.01 \quad (3)$$

wherein $n_1$, $n_0$, $n_A$, and $n_B$ represent the refractive index $n_D$ in the outer peripheral portion, at the center, and at arbitrary points A and B, respectively, and $v_1$, $v_A$, and $v_B$ represent Abbe number $v$ in the outer peripheral portion, and at the arbitrary points A and B, respectively, wherein a polymer constituting the plastic rod lens contains the following building blocks (A) to (C):

(A) a (meth)acrylate unit containing an alicyclic ring and/or a heterocyclic ring, (B) a monomer unit containing an aromatic ring, and (C) a fluorinated alkyl(meth)acrylate unit, and wherein a content of the building block (B) in the polymer increases continuously towards the outer peripheral portion at least within a distance range of 0.8 R to R from the central axis.

2. The plastic rod lens according to claim 1, wherein the polymer further contains a building block (D) which is a methyl(meth)acrylate unit.

3. The plastic rod lens according to claim 2, wherein a polymer containing the building block (A) is contained at least within a distance range of 0 to 0.5 R from the central axis;
   a polymer containing the building block (D) is contained at least within a distance range of 0 to R from the central axis; and
   a polymer containing the building blocks (B) and (C) is contained at least within a distance range of 0.5 R to R from the central axis.

4. The plastic rod lens according to claim 2, wherein a content of the building block (B) in the polymer increases continuously towards the outer peripheral portion at least within a distance range of 0.8 R to R from the central axis.

5. A rod lens array comprising one or more lines of plastic rod lenses of claim 1 arranged in parallel.

6. The rod lens array according to claim 5 satisfying the following requirements:

$$Tc(630) - Tc(470) \leq 0.3 \text{ mm, and}$$

$$Tc(525) \leq 12 \text{ mm,}$$

wherein Tc(λ) represents a conjugation length of the rod lens array when light wavelength is λ nm.

7. A printer comprising the rod lens array of claim 5.

8. An image sensor comprising the rod lens array of claim 5.

9. A rod lens plate comprising plastic rod lenses of claim 1 arranged two-dimensionally.

10. An image sensor comprising the rod lens plate of claim 9.

11. A printer comprising the rod lens plate of claim 9.

* * * * *